United States Patent [19]

Laskin et al.

[11] 4,051,492
[45] Sept. 27, 1977

[54] PHOTOGRAPHIC APPARATUS GEAR TRAIN HAVING A UNIQUE SET OF GEARS

[75] Inventors: Irving Laskin, Sharon; David Van Allen, Malden, both of Mass.

[73] Assignee: Polaroid Corporation, Cambridge, Mass.

[21] Appl. No.: 648,765

[22] Filed: Jan. 13, 1976

[51] Int. Cl.² .............................................. G03B 17/50
[52] U.S. Cl. ......................................... 354/86; 74/462
[58] Field of Search .................... 354/86; 74/457, 460, 74/462

[56] References Cited

U.S. PATENT DOCUMENTS

| 2,220,419 | 11/1940 | Meldahl | 74/462 |
| 3,936,847 | 2/1976 | Erlichman | 354/86 |

Primary Examiner—L. T. Hix
Assistant Examiner—J. A. LaBarre
Attorney, Agent, or Firm—John S. Vale

[57] ABSTRACT

A pair of meshing gears, having unique tooth profiles, are provided in a separable gear train which is usable in a self-developing camera to couple a motor in one housing section of the camera to at least one of a pair of pressure-applying rollers mounted on a second camera housing section that is pivotally coupled to the first section for movement between positions blocking and unblocking access to a film container receiving section in the first housing section. The pair of gears have a speed ratio of other than 1:1 and equal tip spacing to facilitate bringing the pair of gears into operative mesh when the second housing section is moved to the operative blocking position.

20 Claims, 21 Drawing Figures

PHOTOGRAPHIC APPARATUS GEAR TRAIN HAVING A UNIQUE SET OF GEARS

BACKGROUND OF THE INVENTION

1. Field of the Invention

The present invention relates to photography and, more particularly, to photographic apparatus having a gear train for transmitting power from a motor to one or more motor-driven components of the apparatus.

2. Description of the Prior Art

Compact cameras having motor-driven components are well known in the photographic art. For example, highly automated, self-developing cameras, such as the SX-70 Land Camera, marketed by Polaroid Corporation, Cambridge, Mass., include a motor-driven processing roller (one of a pair of pressure-applying rollers), film advance device, camera sequencing or timing wheel, and a device for recocking a reflex operator.

To minimize the size of the camera, the motors are generally of the small, high speed, D.C. type with typical loaded operating speeds of 8,000 to 12,000 rpm when energized by a six-volt battery. Motor power is transferred to each of the motor-driven components by a gear train which serves to (1) provide appropriate speed reductions for driving the various components, and (2) physically couple the motor to components that are mounted at various locations within the camera housing.

The SX-70 camera includes a base housing section having an open ended chamber therein for receiving a film container holding a stack of self-developing film units. Couple to the leading open end of the base section is a loading door and pressure roller mounting section which is adapted to pivot between an operative position; wherein the loading door section is aligned with and extends forwardly of the open end of the receiving chamber to locate the rollers in position to receive a film unit advanced from the container subsequent to exposure; and an inoperative or open position wherein the loading door section is pivoted downwardly to unblock the open end of the receiving chamber for loading and/or withdrawing the film container.

The small high speed motor is located at the trailing end of the base section, aft of the receiving chamber. Power is transmitted to the various motor driven components by an elongated speed reduction gear train that is disposed along the side of the chamber and extends from the motor in the rear to one of the pressure-applying rollers mounted on the forwardly extending loading door section.

Since the gear train spans the interface between the leading end of the base section and the trailing end of the loading door, two meshing gears at the interface must be disengaged to permit the door to be opened and then must be easily and reliably brought back into mesh, without binding, or being brought into nonmeshing abutment, when the loading door section is closed. This type of structure may be thought of as a "hinged gear train" having one gear mounted on the base section and its mating gear mounted on the loading door section so that these two gears mesh and bridge the interface when the loading door section is closed.

When the loading door is closed, these two gears are in mesh. Upon opening the door and disengaging the two gears, the rotational position of the gear at the leading end of the base section is fairly stable because it is coupled all the way back to the de-energized motor which is rendered inoperable by a door switch when the loading door section is opened. On the other hand, the mating gear on the loading door section is coupled to the top pressure roller (in a low friction bearing) and, because of the low gear loading, the mating gear may be thought to be in a "free wheel" condition. The angular or rotational disposition of the mating gear will most likely change (from its position when in mesh) by (1) the act of disengagement, (2) the gear being inadvertently rotated by the user during the process of loading a film container or (3) inspecting and/or performing maintenance on the rollers.

To ensure that these two gears will mesh properly when the loading door is closed, the two gears are identical. That is they have the equal diameters, a speed ratio of 1:1, equal number of gear teeth about the periphery or pitch circles, identical gear tooth profiles and equal tip spacing between adjacent teeth. To minimize possible tip-to-tip abutment when the gears are brought back into mesh, the standard gear blunt tip tooth profile may be modified so that the tips are pointed. This, coupled with the fact that the gear on the loading door is pivoted into engagement with the gear on base section and tends to have a free wheeling rolling action when the two gears make initial contact, greatly facilitates the ease and reliability of bringing these two gears into mesh without causing damage to the gears or inconvenience to the user.

For representative examples of the "hinged gear train" concept outlined above, reference may be had to U.S. Pat. Nos. 3,709,122; 3,714,879; 3,760,701; and 3,906,527 assigned to the same assignee as the present application. Also see U.S. Pat. No. 3,561,340 which discloses a camera having a motor-driven roller assembly (which may be removed for maintenance) that is coupled to a gear train by a pair of 1:1 gears at the point of separation.

The use of 1:1 gears at the point of separation essentially adds a pair of gears to the gear train to facilitate bringing the two sections of the train back into mesh. On the negative side, however, is the question of gear train efficiency or power loss. As the number of gears in a train increases, the power transfer efficiency of the train decreases because of, among other considerations, the friction losses at the meshing teeth and also at the shafts on which the gears are mounted for rotation.

It has been found, that when the 1:1 gears (at the point of separation) have been replaced with a pair of speed reduction or speed increasing gears, in the interest of gear-train efficiency, the problem of getting the two nonidentical gears to remesh properly becomes a serious one.

For example, see U.S. Pat. No. 3,889,280 which discloses a large gear mounted at the leading end of the camera base section which is adapted to mesh with a smaller gear (pinion) coupled to the top roller to provide a speed increase (i.e. the roller rotates at a faster speed than the larger driving gear).

Also, notice should be taken of the following copending applications which feature a pair of speed reduction gears at the point of separation. Ser. No. 554,777, filed on Mar. 3, 1975, by B. K. Johnson et al.; Ser. No. 554,778 (now U.S. Pat. No. 3,967,304), filed on Mar. 3, 1975, by B. K. Johnson et al.; and Ser. No. 628,486, filed on Nov. 4, 1975, by R. M. Augustin et al.; all of said copending applications being assigned to the same assignee as the present application.

When the pair of gears at the point of separation have different numbers of teeth (and correspondingly different diameters to produce speed reduction or increase), the tip spacing or chordal distance between adjacent teeth at the tips will be different (by definitions which will be developed later in this disclosure). If standard gear profile teeth (blunt tips) are used, the nonmeshing problem is even further compounded because of the increased probability of tooth tip abutment.

When attempts have been made to modify standard gears (for example, a 12-tooth pinion and 36-tooth gear) by increasing the tooth length to form points at the tip, it has been found that the tip spacing on the pinion (smaller gear) increases to a larger extent than the tip spacing on the larger gear. In some cases, this may cause an interlock condition when the two gears are attempted to be pivoted into mesh. That is, the opposite outside edges of two adjacent teeth on the large gear may fit into the space subtended by the two inside edges of a pair of adjacent teeth on the pinion.

Also, when one of the gears in a set is a small diameter pinion, it is common practice in gear technology to extend the addendum or length of the pinion teeth to prevent undercut (reduction of the thickness of the tooth at its base) and to decrease the length of the teeth on the mating gear. Again, this promotes tip spacing mismatch and has a tendency to cause the interlock condition.

SUMMARY OF THE INVENTION

The present invention provides a pair of gears which have uniquely configured meshing tooth profiles that allow the gears to be used at the point of separation of a separable gear train in a photographic apparatus (preferably a self-developing camera); provide a speed reduction (or a speed increase if the application should require it) at the point of separation; and yet, unlike standard gears or gears modified according to prior art teachings and standard practices in gear technology, may be easily and reliably pivoted into mesh without causing jamming, binding, tooth interlock, or nonmeshing tooth-tip abutment.

In the illustrated embodiment, the self-developing camera includes a "hinged-type" gear train having a 12-tooth pinion gear and a 36-tooth mating gear at the point of separation. The pinion is coupled back to the motor and is the driver and the 36-tooth gear is coupled to one of the pressure-applying rollers and serves as the follower.

It will be shown later in this disclosure that it is standard practice to modify the tooth profile of such a pinion gear by extending the length (and corresponding tooth thickness) of the pinion teeth and shortening the mating teeth on the gear to prevent undercutting of the pinion teeth and increase their strength. Also, it will be shown that when this standard modification (known as long-short addendum gears) is made to such gears, the effect on the tip spacing is detrimental to pivoting the gears into mesh.

The present invention provides a pinion and gear which have tooth profiles that are diametrically opposed to the teachings of the prior art and standard gear technology practices. That is, the teeth of the gear have been lengthened and the teeth of the pinion have been shortened to provide a pair of gears with a speed ratio of other than 1:1 and yet having equal tip spacing to facilitate bringing the gears into mesh in the environment of a hinged gear train. While such tooth profile modification is highly unusual, the unique gears have been configured to maintain conjugate action (that is, the active tooth profiles are based on involute curves) and have a standard pressure angle of 20 degrees. In other words, smooth running and gear efficiency were not substantially sacrificed to facilitate bringing the gears into mesh by providing equal tip spacing.

Therefore it is an object of the present invention to provide a photographic apparatus having a gear train therein that is characterized by the fact that a pair of meshing gears therein will from time to time have to be disengaged and brought back into mesh and that said pair of gears are uniquely configured to have a speed ratio other than 1:1 and have equal tip spacing between adjacent teeth to facilitate bringing the pair of gears into mesh when so required.

It is yet another object to provide such a pair of gears wherein the tooth profile of the pinion has a shorter addendum than the addendum of the mating gear tooth profile.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
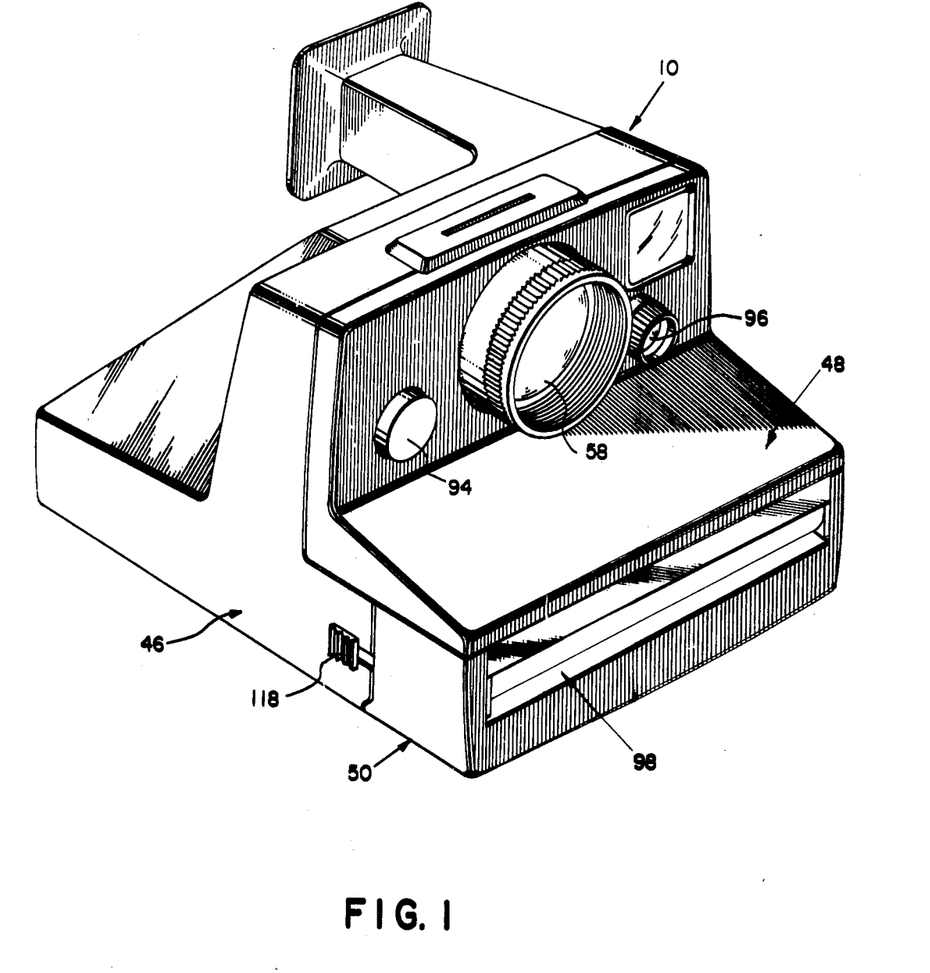
FIG. 1 is a perspective view of a completely assembled self-developing camera embodying the instant invention.
Figures 2, 3:
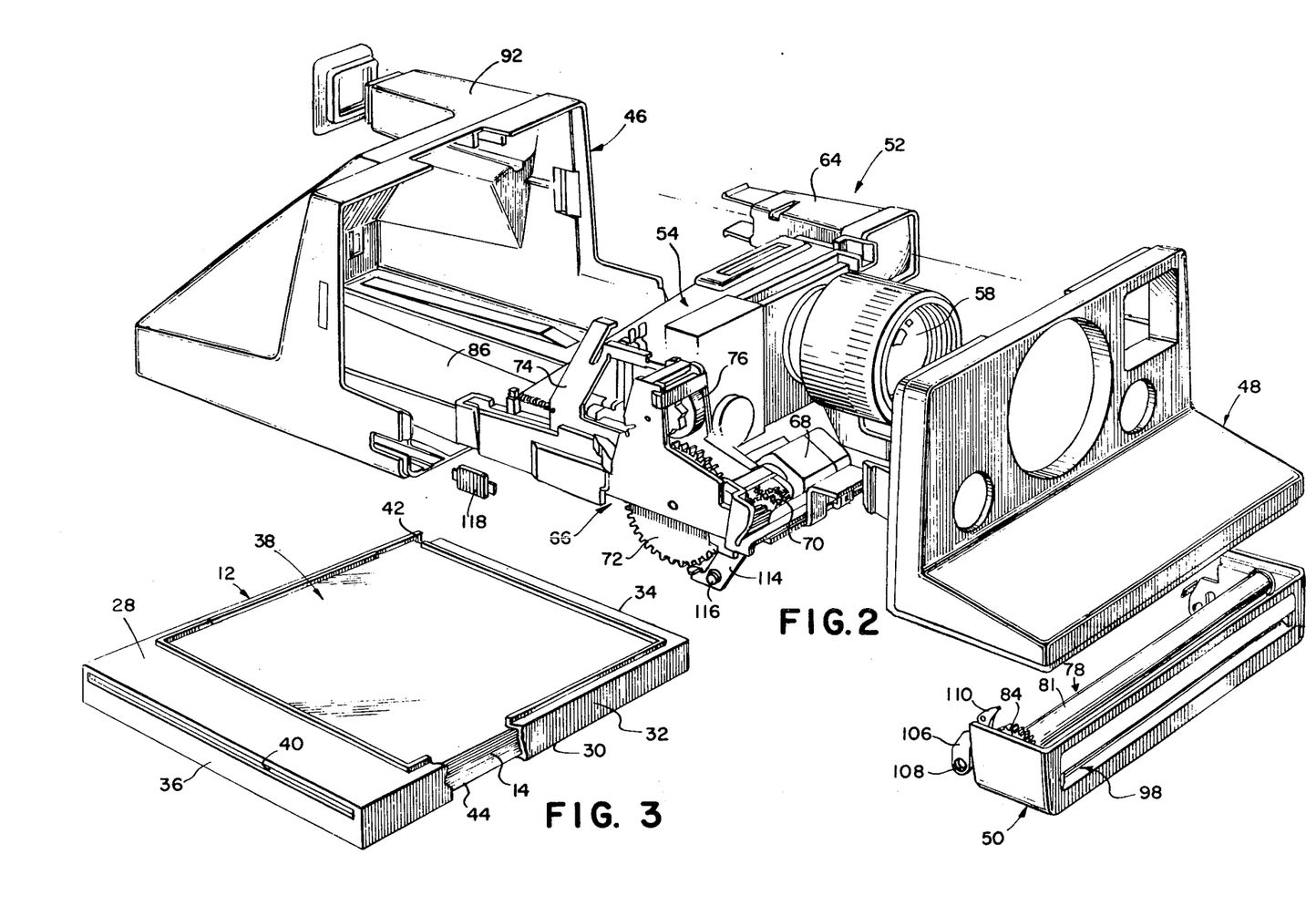
FIG. 2 is an exploded perspective view of the camera shown in FIG. 1 illustrating the relationship of the major modular units forming the camera.
FIG. 3 is a perspective view, partly in section, of a film container, holding a plurality of self-developing film units, that is adapted for use with a camera embodying the instant invention.

FIGS. 1 and 3 of the drawings show, respectively, a self-developing camera 10 which is adapted to receive a film container 12 holding a plurality of self-developing film units 14 arranged in stacked relation therein.

Since the present invention is directed to a pair of uniquely configured gears forming part of a "hinged" or separable gear train in camera 10, the camera 10, film container 12, and self-developing film units 14 will be described only in sufficient detail to provide the necessary background for understanding the present invention.

Figure 7:
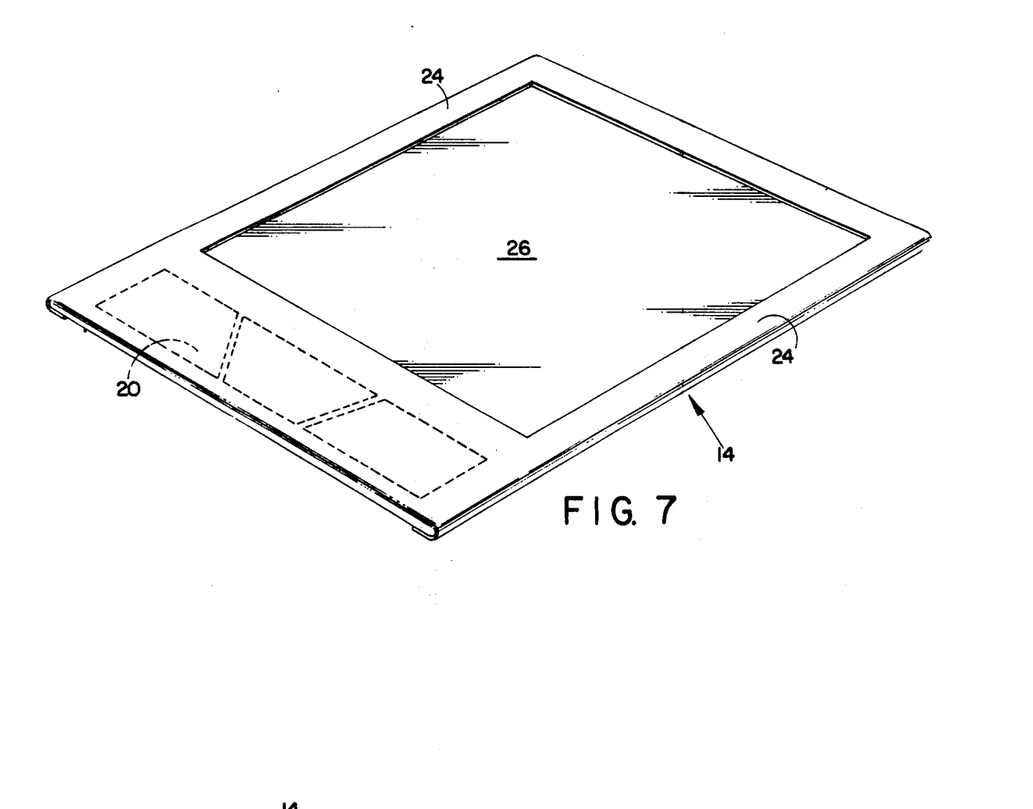
FIG. 7 is a perspective view of a self-developing film unit located in the film container of FIG. 3.
Figure 8:
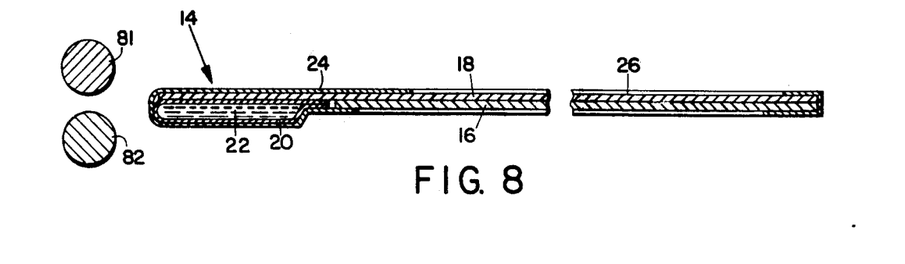
FIG. 8 is a sectional view of the film unit of FIG. 7.

The self-developing film unit 14 is of the integral "nonpeel-apart" type and is best shown in FIGS. 7 and 8 of the drawings. Basically it is a multilayer structure or laminate which is diagrammatically illustrated in FIG. 8 as including a bottom sheet-like element 16 and a superposed top sheet-like element 18. Attached to the leading end of element 18 is a rupturable container 20 holding a supply of fluid processing composition 22 therein.

In actuality, the multilayer structure includes an opaque bottom support sheet, a top transparent support sheet, and a plurality of layers sandwiched therebetween and including one or more photosensitive layers and one or more image-receiving layers. The laminate is bound along its lateral edges by a binding element 24 which also defines the bounds of a generally square or rectangular image-forming area 26 on the top transparent support sheet through which actinic radiation is transmitted to expose the photosensitive layer or layers. Subsequent to exposure, the film unit is progressively advanced between a pair of pressure-applying members or rollers which discharge the fluid 22 between a predetermined pair of adjacent layers within the multilayer structure. In FIG. 8 of the drawings, the fluid 22 is adapted to be spread between elements 16 and 18 which are intended to show the interface between the predetermined pair of adjacent layers. In reality, element 18 includes the top transparent support sheet in certain chemical layers and element 16 includes the bottom support sheet and certain other chemical layers.

For a more detailed description of film unit 14, reference may be had to U.S. Pat. No. 3,415,644 issued to E. H. Land on Dec. 10, 1968.

Referring to FIG. 3, the film container 12 is generally a box-like structure, preferably of molded plastic construction, and includes a forward wall 28, a rear wall 30, and a peripheral section joining walls 28 and 30 and including a pair of lateral side walls 32, a trailing end wall 34 and a leading end wall 36. Forward wall 28 has a square or rectangular exposure aperture 38 therein which is coextensive with the image-forming area 26 of the film unit 14.

The film units 14 are arranged in stack relation within film container 12 such that the forwardmost film unit bears against the interior surface of forward wall 28 and is located in position for exposure through exposure aperture 38. Subsequent to exposure, the forwardmost film unit 14 is adapted to be advanced from film container 12 through an elongated film withdrawal slot 40 in forward wall 36. As will be described later, camera 10 includes a film advancing mechanism which is adapted to extend through an opening 42 near a trailing end corner of film container 12 for engaging and advancing the exposed forwardmost film unit through film withdrawal slot 40.

The stack of film units 14 is spring biased toward the interior surface of forward wall 28 by a spring platen (not shown) and, preferably, a flat battery 44 for powering the electrical equipment of camera 10 is provided within film container 12 in overlying relationship to rear wall 30 which has openings (not shown) therein providing access to the battery terminals.

Camera 10 is a compact, nonfolding, modular, battery operated, self-developing camera. As best shown in FIGS. 1 and 2, it includes a housing which is formed by three molded plastic housing sections 46, 48, and 50.

The major housing section 46 is a hollow open-ended structure which is adapted to receive a major modular unit 52 mounting most of the operative components and subassemblies of the camera on a mounting frame 54 thereof.

The mounting frame 54 is a hollow, open-bottomed, cone-like structure of molded plastic construction which forms the camera exposure chamber 56 (see FIG. 4) and mounts; an optical system including an objective lens 58, a mirror 60 (on the interior surface of an inclined rear cone wall 62) and a viewfinder assembly 64; a camera drive, sequencing, film advance and film counting assembly 66 which includes an electrical motor 68, part of a gear train 70, a sequencing gear 72, a film advance device 74 and a film counter 76; and pressure-applying assembly 78 to which housing section 50 is attached and includes a mounting bracket 80 and a pair of juxtaposed pressure-applying members of rollers 81 and 82 and a roller drive gear 84 on the end of roller 81. Gears 84 form part of the gear train 70, as will be described hereinafter, and is coupled to motor 68 through intermediate gears in the train.

Figure 4:
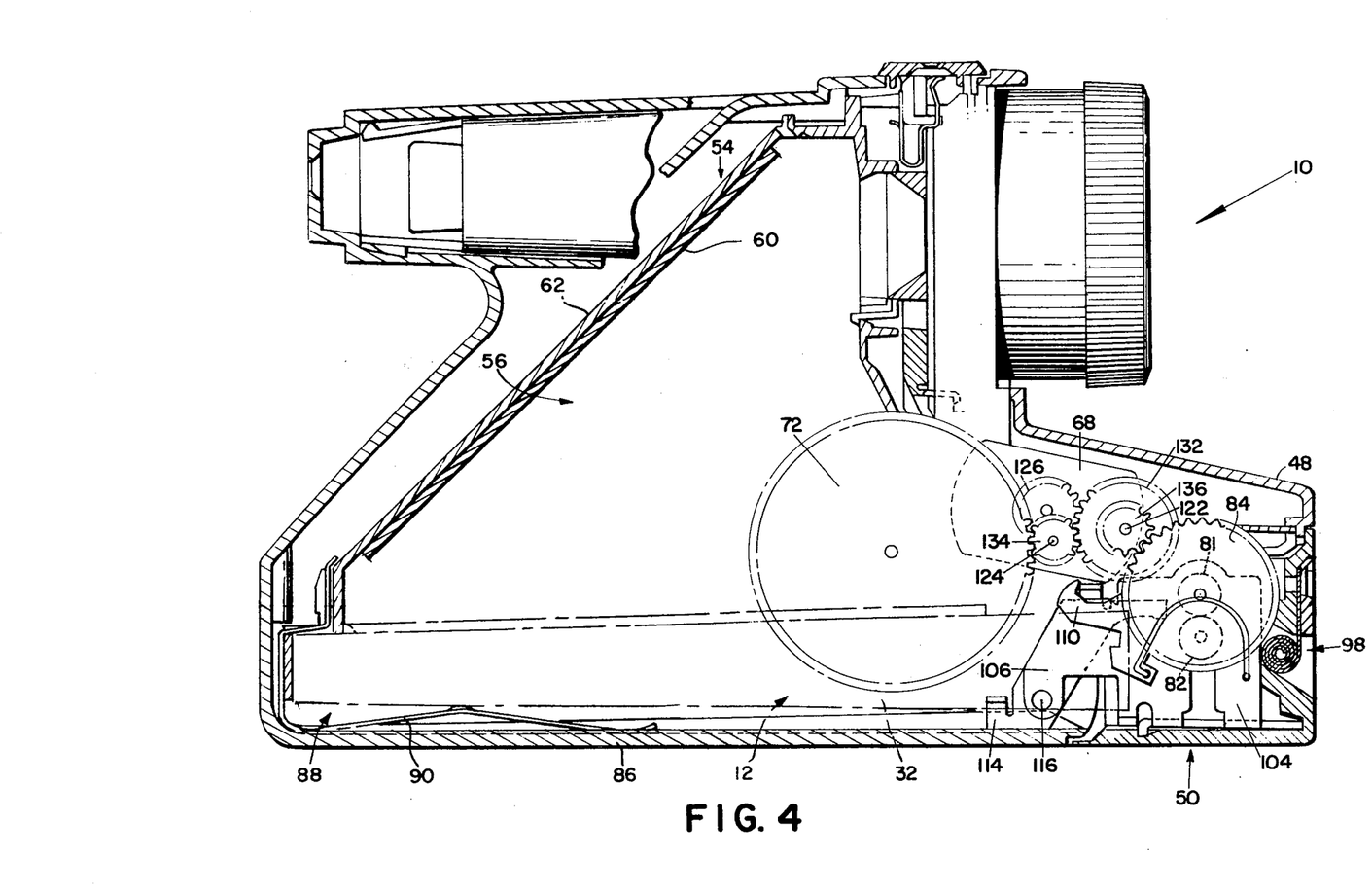
FIG. 4 is a side elevational view, partly in section, of the camera of FIG. 1 showing a pinion and gear in mesh at the point of separation of a hinged gear train.

When the camera 10 is assembled, the cone-like frame 54 cooperates with the bottom wall 86 of housing section 46 to define an open-ended chamber 88 in the base of housing section 46 for receiving film container 12 in the position shown in FIG. 4 with the film container exposure aperture 38 facing the open bottom of cone-like frame 54. Roller mounting bracket 80 is pivotally mounted on frame 54 so that the roller assembly 78 and housing section 50 pivot downwardly to provide access to the open end of receiving chamber 88 for inserting and withdrawing film container 12. A pair of battery contacts 90, mounted on bottom wall 86, connect battery 44 to the camera's electrical system.

In operation, the user views and frames the scene to be photographed through the direct viewing viewfinder assembly 64 (enclosed by a viewfinder housing 92 integrally molded with housing section 46) and focuses lens 58. A cycle of operation is initiated by depressing a camera start button 94 on housing section 48 which causes motor 68 to be energized thereby driving gear train 70 including roller gear 84 and sequencing gear 72. Sequencing gear 72 operates a mechanism (not shown)

which unlatches a normally closed electronic shutter and latches power onto an electronic logic and power circuit (neither of which is shown). This circuit controls an automatic exposure control circuit (not shown) which includes a photocell to which scene light is directed by a window 96 on housing section 48. When power is latched on, motor 68 is de-energized.

Image-bearing light from the scene is transmitted by lens 58 to cross chamber 56 where it impinges upon the mirror 60. From mirror 60, the light is reflected downwardly through the exposure aperture 38 in film container 12 to expose the forwardmost film unit 14. Using well known light integrating techniques, the exposure control circuit provides an exposure termination signal to the logic circuit which in turn provides appropriate signals to cause the electronic shutter to close and motor 68 to be reenergized.

Sequencing gear 72 drives the film advance device 74 forwardly along a linear path and a hook-like member (not shown) at the trailing end thereof extending through film container access opening 42 engages the trailing end of the exposed forwardmost film unit 14 and advances it forwardly through film withdrawal slot 40 into the bite between rollers 81 and 82. Roller 81 is driven in a direction to cause the film unit to be advanced therebetween for progressively applying a compressive pressure along the length of the film unit 14. The film unit 14 exits from camera 10 through a film exit opening 98 in housing section 50. At the termination of the processing cycle, the operating mechanisms are reset for the next cycle of operation and the cycle is automatically terminated.

Figures 5, 6:
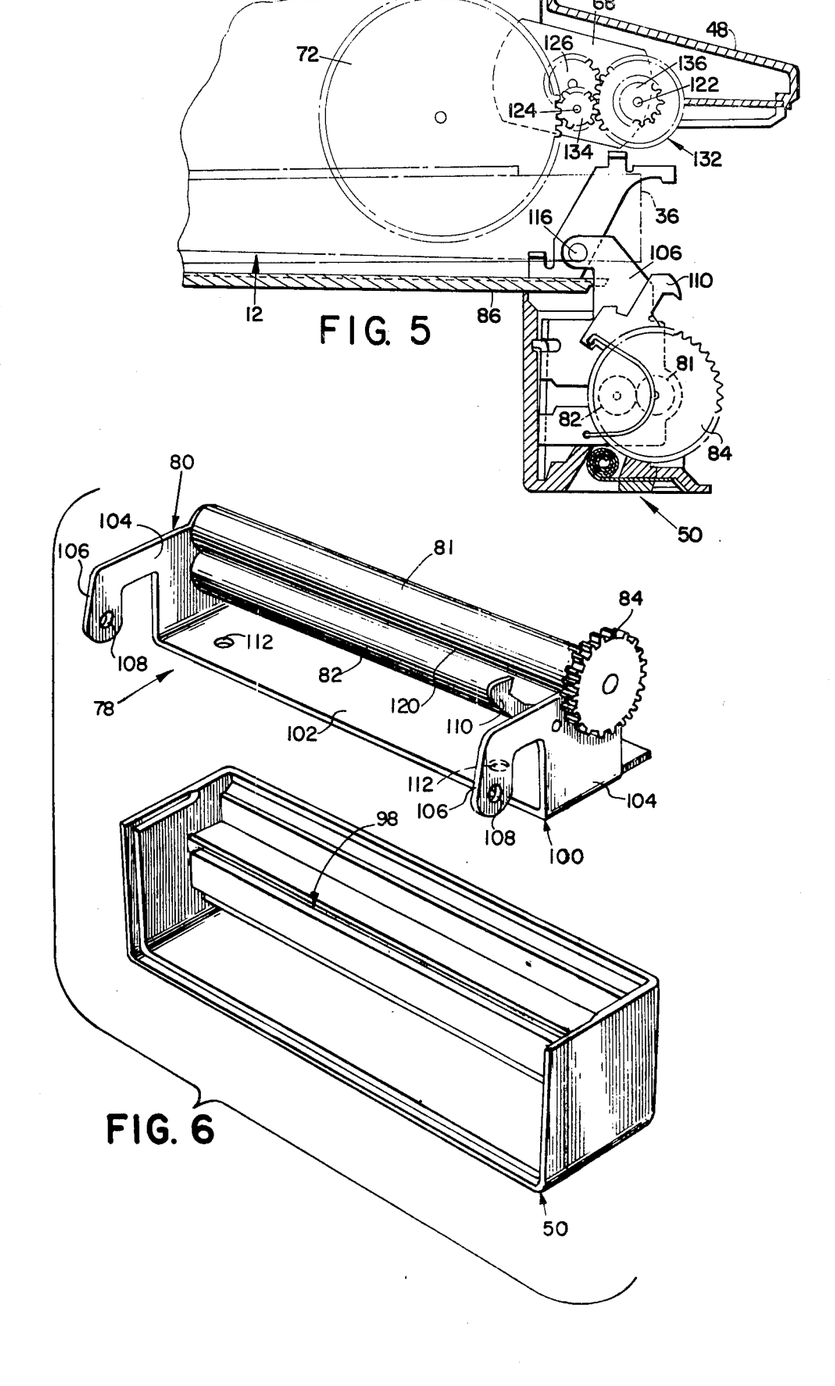
FIG. 5 is a side elevational view, partly in section, of the leading end of the camera shown in FIG. 4 showing a loading door section of the camera in an open position and the roller gear thereon disengaged from the pinion.
FIG. 6 is an exploded perspective view of the loading door section and a roller assembly having a roller drive gear coupled to the end of the top roller.

As best shown in FIG. 6, the roller assembly 78 comprises the roller mounting bracket 80 and the juxtaposed pair of pressure-applying members or rollers 81 and 82 mounted thereon.

Roller mounting bracket 80 is preferably of stamped metal construction and includes a generally planar, horizontal bottom member 102, and a pair of integrally formed lateral side members 104 upstanding vertically at the lateral ends of bottom member 102. Integrally formed with side members 104 and extending rearwardly therefrom are a pair of arcuate mounting flanges 106 having mounting holes 108 therein. Other structural features of bracket include an upstanding latch member 110 integrally formed with the right hand mounting flange 106 (as viewed in FIG. 6) and a pair of locating or positioning holes 112 in horizontal member 102 for locating or positioning housing section 50 with respect to bracket 80.

The pressure-applying members or rollers 81 and 82 are rotatably mounted transversely of the side members 104 with their respective lateral ends mounted in suitable bearings (not shown) in lateral side walls 104. The roller drive gear 84 is mounted on the right hand end of roller 81.

As best shown in FIG. 2 the component mounting frame 54 includes a pair of laterally spaced depending legs 114 having outwardly extended pins 116 thereon which are adapted to extend through the openings 108 on bracket mounting flanges 106 thereby pivotally mounting the roller assembly on the leading end of frame 54 for pivotal movement between its positions blocking and unblocking the open end of camera receiving chamber 88 as shown in FIGS. 4 and 5. When the roller assembly is in its closed position, the latch member 110 cooperates with a slidable latch member 118 on the right hand side of housing section 46 to maintain the roller assembly in the closed position wherein the entrance side 120 (the horizontal bite between rollers 81 and 82) of the pressure-applying members is adjacent the film withdrawal slot 40 of film container 12 and the leading end of the forwardmost film unit 14 located therein.

For a more detailed description of the previously described structure and operation of camera 10, reference may be had to copending applications Ser. No. 554,777, filed Mar. 3, 1975 by B. K. Johnson et al.; and Ser. No. 554,778, filed on Mar. 3, 1975 by B. K. Johnson et al.; both of these applications being assigned to the same assignee as the present invention.

Attention will now be directed to the gear train 70 which transmits power from the motor 68 to the top roller 81 and the camera sequencing gear 72.

The gear train may be described as a "hinged type" having one portion mounted on the modular section 66 in the first housing section 46 and another portion (gear 84) mounted on the second housing section 50.

Figure 9:
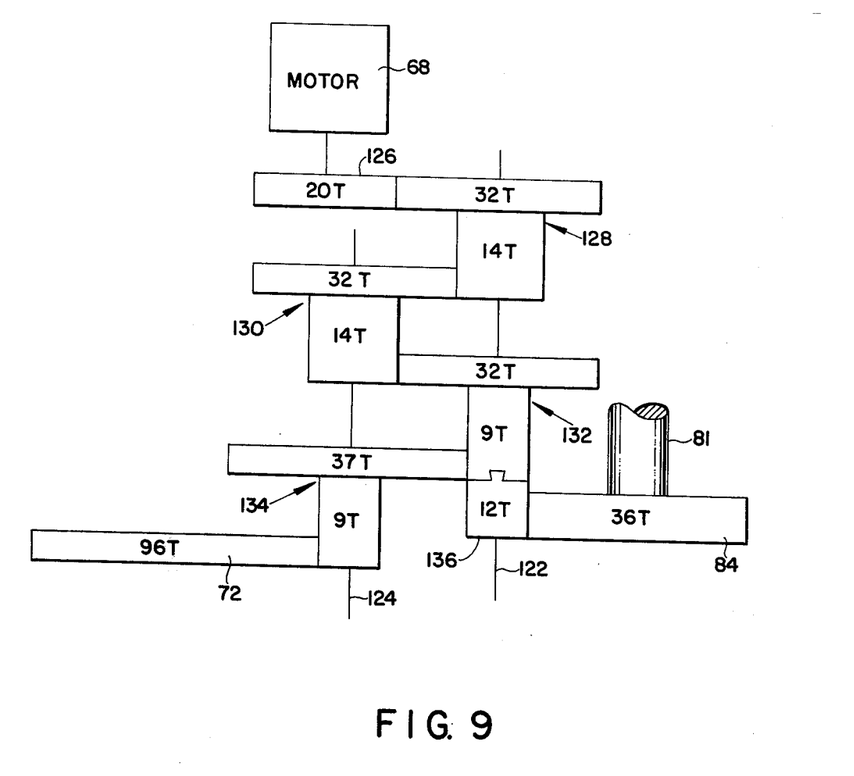
FIG. 9 is a diagrammatic illustration of the gear train which transmits power from a camera motor to various motor-driven components including the top roller.

As best shown in FIG. 9 the modular portion of the gear train 70 comprises a cluster of rotationally mounted intermeshed gears to provide appropriate speed reductions from motor 68.

These gears are rotationally mounted on two parallel shafts 122 and 124 and from a drive gear 126 on the output shaft of motor shaft 68 power is transferred to compound gear 128 on shaft 122. The small segment of gear 128 is in mesh with the large segment of compound gear 130 on shaft 124 which in turn has a smaller segment in driving mesh with a compound gear 132 on shaft 122. The smaller segment of gear 132 is in driving mesh with the large segment of compound gear 134 on shaft 124 which in turn has a smaller segment in driving mesh with the camera sequencing gear 72.

Keyed or fixedly coupled to the smaller segment of compound gear 132 is a pinion gear 136 which rotates about shaft 122 with gear 132. This pinion 136 is in operative mesh with the roller gear 84 when housing section 50 and roller mounting bracket 80 are located in the closed or operative position for providing rotational drive to the top roller 81. When housing section 50 is opened (See FIG. 5) to provide access to the film container receiving chamber 88, gear 84 becomes disengaged from pinion 136. The present invention is directed to providing unique tooth profiles for pinion 136 and gear 84 to facilitate bringing gear 84 back into operative mesh with pinion 136 when housing section 50 is pivoted upwardly into the closed operative position.

In the illustrated embodiment the pinion 136 (smaller gear) has 12 teeth and the roller gear 84 has 36 teeth thus providing a speed reduction from the pinion 136 to roller 84. It will be noted however that in some instances the drawings will not accurately reflect the shape of tooth profiles or the correct number of gear teeth because of space limitation and the technical difficulty in providing such an illustration. Unless otherwise noted, the gears, including some renderings of pinion 136 and gear 84 will be diagrammatic in nature to show their relative positions on camera 10 rather than to accurately represent the unique tooth profiles to be described in detail hereinafter along with selected accurate views of such profiles.

Pinion 136 and gear 84, when in mesh, span or bridge the interface between housing sections 46 and 50 and may be thought of as the point of separation in a hinged-type gear train.

As noted earlier, one may facilitate bringing such a pair of gears into mesh by using a pair of identical gears (1:1) which have identical tip spacing between adjacent teeth. However, such gears do not provide the required speed reduction and only add to the power loss of the train. They also take up more space, a concept that is at odds with reducing camera size to an absolute minimum.

In order to describe the unique gear teeth profiles of pinion 136 and gear 84, and, more importantly, to explain how this unique structure departs from the prior art and the standard practices of gear technology, some basic definitions and gear terminology will have to be presented at this point.

To supplement the following outline, one may wish to consult the following references which explore gear technology in detail. *Analytical Mechanics of Gears,* by Earle Buckingham, published by Dover Publications, Inc.; *Engineering Kinematics,* by Alvin Sloane, published by The Macmillan Company; selected papers entitled *Recess Action Gears,* by Eliot K. Buckingham, *Effects on Size on Gear Design Calculations,* by Paul M. Dean, Jr., *Charts for Designing Long-Short Addendum Spur Gears,* by Wayne H. Bookmiller published in a book entitled *Gear Design and Application,* published by McGraw-Hill; and *The Gear Handbook,* edited by Darle W. Dudley and published by McGraw-Hill.

A pair of meshed gears may be visualized in terms of a pair of rolling cylinders in frictional engagement, one being the driver, the other the follower. Ignoring slippage the speed ratio—or the angular velocity of the follower divided by the angular velocity of the driver—is a constant quantity. Upon adding gear teeth to the two cylinders, this constant quantity or ratio is maintained.

Looking only at the ends of the cylinders (See FIG. 10), one may reduce the analogy to a two dimensional view and think of two rolling circles called pitch circles. The line joining their axis of rotation is the line of centers, and the point of contact is the pitch point. The diameters of the pitch circle are called pitch diameters.

Figure 10:
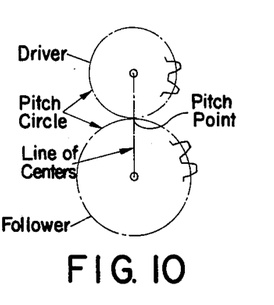
FIG. 10 is a diagrammatic illustration to define the term pitch circle.

The pitch circles fix the speed ratio $$\omega_f/\omega_d = D_d/D_f$$

where $D_d$ is the pitch diameter of the driver and $D_f$ is the pitch diameter of the follower.

Figure 11:
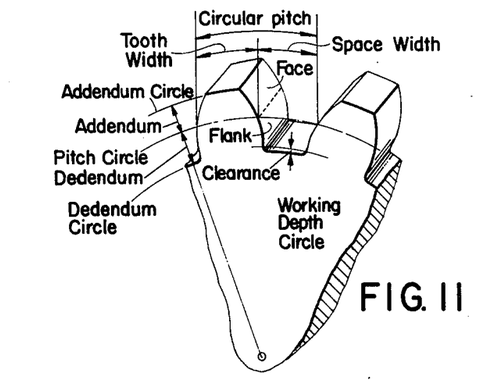
FIG. 11 is a perspective view of a portion of a gear having a standard tooth profile to define standard terms applied to such gears.

Using the pitch circles as a basis, the gear teeth are formed as shown in FIG. 11. The outermost circle of the gear is called the addendum circle and the radial distance from the pitch circle to the addendum circle is the addendum. The circle found at the bottom of the space between teeth is the dedendum circle and the radial distance from the pitch circle to the dedendum circle is the dedendum. When another gear is in mesh with the gear of FIG. 11, its addendum will project into the space between teeth of that gear to the working depth circle thereby providing a certain amount of clearance.

Circular pitch is the distance between adjacent teeth on the pitch circle and diametral pitch is the ratio of the number of teeth T to the pitch diameter D. For example, if a 3-inch pitch diameter gear has 30 teeth, the diametral pitch equals 10. But if the 3-inch gear had 60 teeth, the diametral pitch would equal 20.

The face of the tooth is the tooth surface between the pitch and addendum circles. The flank of the tooth lies between the pitch and dedendum circles. The illustrated gear tooth of FIG. 11 is of the standard gear profile and has a blunt or flat tip called the face of the gear.

Without going into extensive detail, mating gear teeth are designed for conjugate action. That is the tooth profiles are based on complementary curve to maintain a substantially constant driving force or pressure as corresponding teeth approach the pitch point, come into initial contact, engage in sliding contact, pass through the pitch point, and then begin disengagement as they pass beyond the pitch point.

Over a long period of time gear tooth profiles have evolved to the point where it is more or less standard practice to base the tooth profiles on involute curves of circles to provide the necessary conjugate action.

Figure 12:
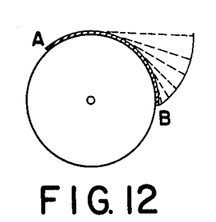
FIG. 12 is a diagrammatic illustration showing how an involute of A circle is generated.

An involute of a circle is a definite property of that circle. It may be best visualized by considering FIG. 12. If a cord, fastened to a cylinder at point A and kept constantly taut, is unwound from the circumference, any point, like B, describes a curve called the involute of the circle.

Figure 13:
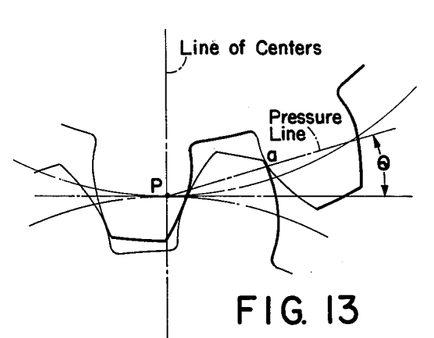
FIG. 13 is a diagrammatic illustration of two gears in mesh showing the pressure angle.

When two teeth of mating gears are in contact as at point *a* in FIG. 13, a line may be drawn from the point of contact to the pitch point P. This line is called the pressure line and the angle formed by the pressure line and a normal to the line of centers of the gears is called the pressure angle. For reasons that are beyond the scope of this disclosure, it is desirable to design a set of gears having a standard pressure angle, one of the most common being 20°.

Figure 14:
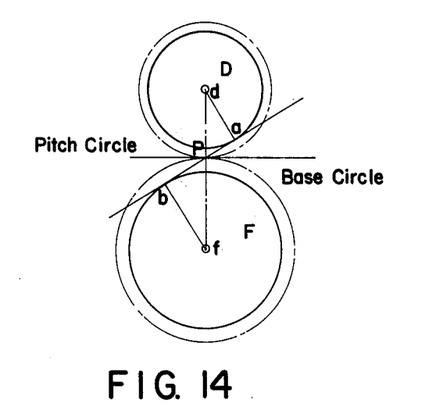
FIG. 14 is a diagrammatic illustration of the base circles and pressure angle of a set of gears.

When the pitch circles and pressure angle for a given set of gears have been chosen, then two circles, concentric with the pitch circles and tangent to the pressure line at *a* and *b* may be drawn as shown in FIG. 14. It is these circles whose involutes will become the tooth profiles and they are called the base circles of the gears.

As noted earlier, there are standard gear tooth profiles that have evolved over a long period of time. The tooth profile is based on involute curves and the teeth are characterized by their blunt tips. Standard profiles allow one to select a pair of gears with the desired number of teeth without worrying whether the gears will mesh. For example, if the desired speed ratio is 1:2 one may select a 20-tooth driver and a 40-tooth follower. The speed ratio may be changed to 1:3 simply by selecting a 60-tooth (standard profile) gear to replace the 40-tooth gear.

Figure 15:
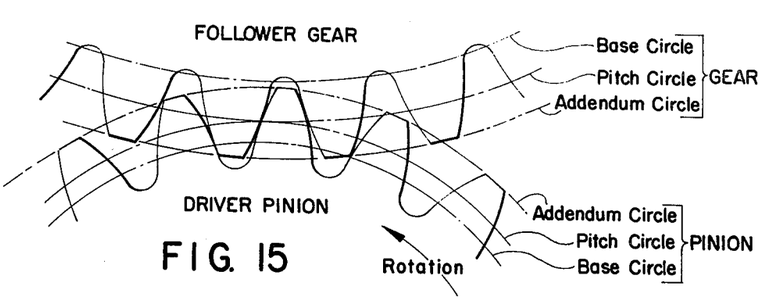
FIG. 15 shows a set of standard profile gears in mesh.

FIG. 15 is a diagrammatic illustration of a pair of standard profile gears. The bottom gear is the driver and the top gear is the follower. By definition, these gears will be blunt tipped and have equal addendums and corresponding dedendums to receive the addendums. We will assume that the driver is a 12-tooth pinion and the follower is a 36-tooth gear.

Because the gears mesh, it is not readily apparent that the tip spacing between the midpoints of adjacent teeth on the 36-tooth gear and the 12-tooth pinion is not equal. The spacing between teeth is equal at the pitch circle. When equal addendums are added radially, the tip spacing of the 12-tooth gear increases to a larger extent than the tip spacing of the 36-tooth gear because of the different angles subtended by adjacent teeth on each gear. For example, adjacent teeth on the 36-tooth gear subtend an angle of 10° while adjacent teeth on the 12-tooth gear subtend an angle of 30°.

The unequal tip spacing of standard gears is of no importance when the gears are used in an application where they are in permanent mesh. However when one attempts to use standard gear tooth profiles for the pinion 136 and the roller gear 84 in a hinged gear train, it is readily apparent that the unequal tip spacing will tend to cause jamming and binding.

Also, the blunt tip of the standard profile is detrimental because of the tendency to promote, rather than minimize, nonmeshing tooth tip abutment.

One way to minimize the tip abutment problem is to extend the standard profile teeth until they come to a point. This means that the addendums of both gears will be increased and their line of centers will have to be extended for proper mesh.

Figure 21:
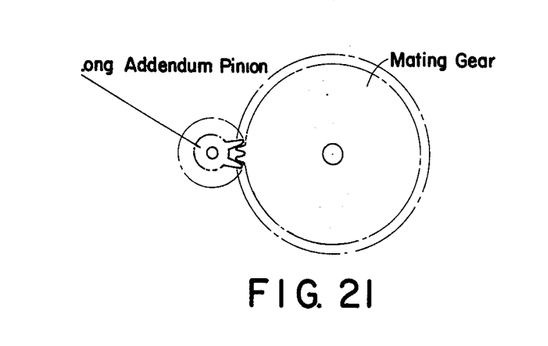
FIG. 21 shows a pair of gears having tooth profiles that interlock when an attempt is made to pivot them into mesh.

When this approach has been tried, it was found that the tip spacing problem was more serious. Again, the tip spacing of the 12-tooth pinion increased radially at a faster rate because of the different angles subtended by the adjacent teeth on the two gears. This caused an interlock condition when the gears were attempted to be brought into mesh. That is the outside edges of two adjacent teeth on the 36-tooth gear fit into the space subtended by the inside edges of two adjacent teeth on the 12-tooth gear as shown in FIG. 21.

From the above, one skilled in the art will appreciate that gears 136 and 84 cannot have standard tooth profiles or even standard profiles that have been extended to a point without causing jamming, binding, tip abutment, or even tooth interlock.

It is also common practice in gear technology to design a set of meshing gears, for certain applications, having unequal addendums. This is especially true in gear sets that include a small diameter pinion. In order to provide clearance for the addendum of the mating larger gear, the dedendum of the standard profile pinion extends downwardly into the base circle of the pinion causing a condition known as undercut. That is, the base of the pinion tooth is thinner than if the standard involute curve defined the base of the tooth. In effect, to get the necessary clearance, the pinion tooth base is weakened.

Figure 16:
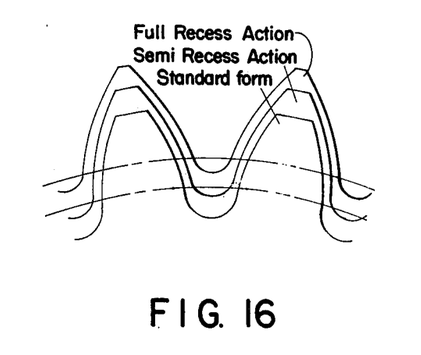
FIG. 16 shows the effect of increasing the addendum on tooth thickness.

To overcome this problem, the gears are designed with unequal addendum so that the pinion has a longer addendum and the mating gear has a correspondingly shorter addendum. From FIG. 16 one will see that as the addendum is increased, the tooth becomes correspondingly thicker thereby adding strength to the tooth. In FIG. 16, the innermost tooth is the standard form. The next two are known, respectively, as semirecess action and full recess action tooth forms.

Modification of the addendum of the pinion to avoid undercut, and in most cases decreasing the addendum of the gear, is recommended when either or both gears have small numbers of teeth; the gears are used in speed increasing drives; the gears carry maximum power for a given weight allowance; or an absolute minimum of energy loss through friction is to be achieved.

The amount the addendum of small gears should be enlarged to avoid undercut has been standardized and such information is available in the gear technology references cited previously herein.

Figure 17:
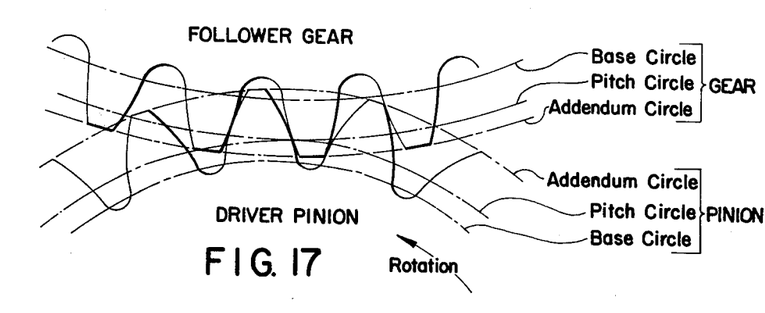
FIG. 17 shows a long addendum pinion in mesh with a short addendum gear.

FIG. 17 shows a 12-tooth driver pinion having an extended addendum in mesh with a 36-tooth follower gear having a reduced addendum to compensate for the increased addendum of the pinion. It will be noticed that the pinion teeth are both longer and thicker than the standard form pinion teeth in FIG. 15. The semirecess action teeth pinion teeth shown in FIG. 17 avoid the undercut problem, are stronger than standard tooth profiles, and tend to be more pointed at the tip. But this gear set is not well suited for the hinged gear train application because of the unequal tip spacing.

Again, the addendum has been extended on the small gear having adjacent teeth that subtend an angle of 30°. Since the thicker teeth are even longer than standard teeth that have been extended to form a point at the tip, the mismatch of tip spacing is even greater and if applied to pinion 136 and gear 84, tooth interlock will occur when these gears are attempted to be brought into mesh.

To solve the meshing problem of the hinged gear train, pinion 136 and gear 84 have been designed to have equal tip spacing and pointy teeth profiles. This has been accomplished by proceeding in direct contradiction to the prior art and standard pract..es of gear technology— namely providing a long-short addendum gear set where the addendum of gear 84 has been extended and the addendum of the small pinion gear 136 has been decreased accordingly. While standard practice tells us to extend the addendum of the pinion to avoid undercut, pinion 136 has had its addendum shortened to provide equal tip spacing with the mating gear 84. The fact that the pinion does have undercut is secondary to the requirement for equal tip spacing. For this application, any loss of inherent strength due to the undercut and the reduced thickness of the short addendum pinion tooth can be compensated for by properly selecting the material from which the gear is made. For example, in this application it is preferable to form the gears of sintered stainless steel for reasons of strength and other benefits such as the ability to get a better interference fit of gear 84 with the shaft on which it is mounted.

Earlier, it was shown that as the addendum on the 12-tooth pinion was extended, the tip spacing increased at a greater rate than if the same addendum was added to the 36-tooth gear because two adjacent teeth on the pinion subtend the larger 30° angle than the corresponding 10° angle on the mating gear. In other words, by extending the addendum on the pinion, which is standard practice for small gears, the tip spacing mismatch became even more exaggerated.

By following the opposite procedure of lengthening the addendum of gear 84 having adjacent teeth that subtend the smaller 10° angle, and decreasing the length of the addendum of the matching pinion 136, the tip spacing mismatch moves in the opposite direction, and finally becomes equal when the proper ratios are reached.

Figure 18:
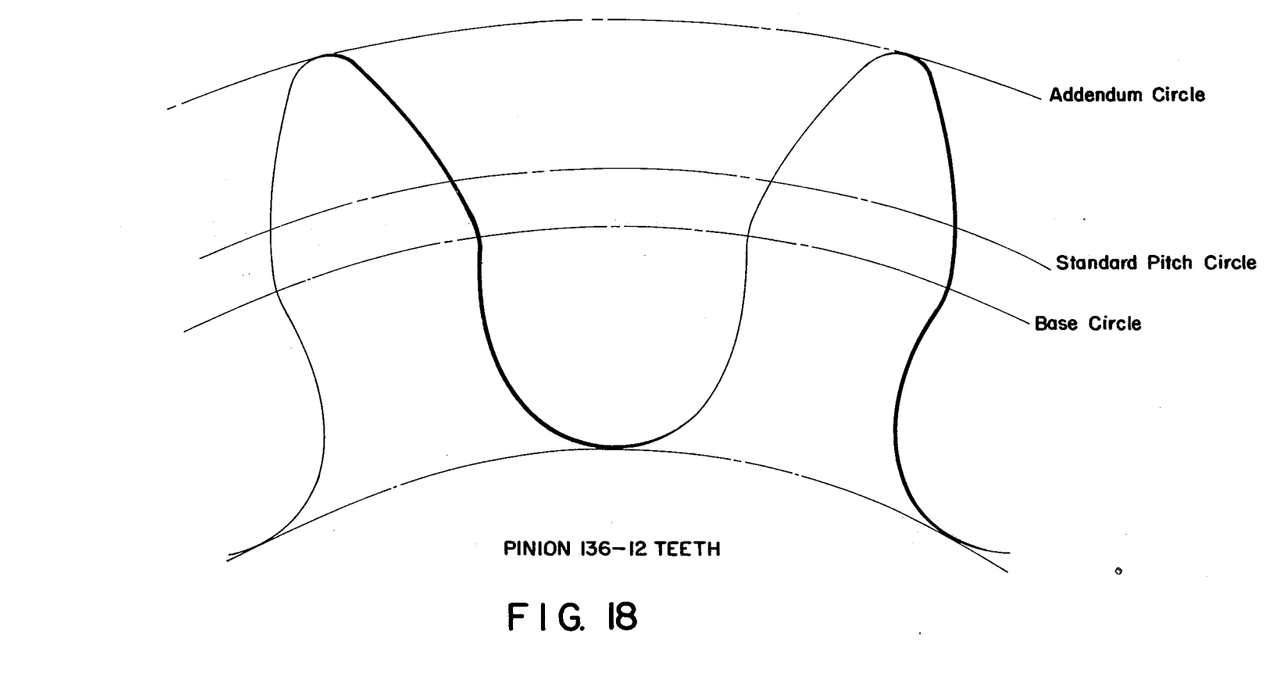
FIG. 18 is a drawing of the tooth profile embodying the present invention of a 12-tooth short addendum pinion.
Figure 19:
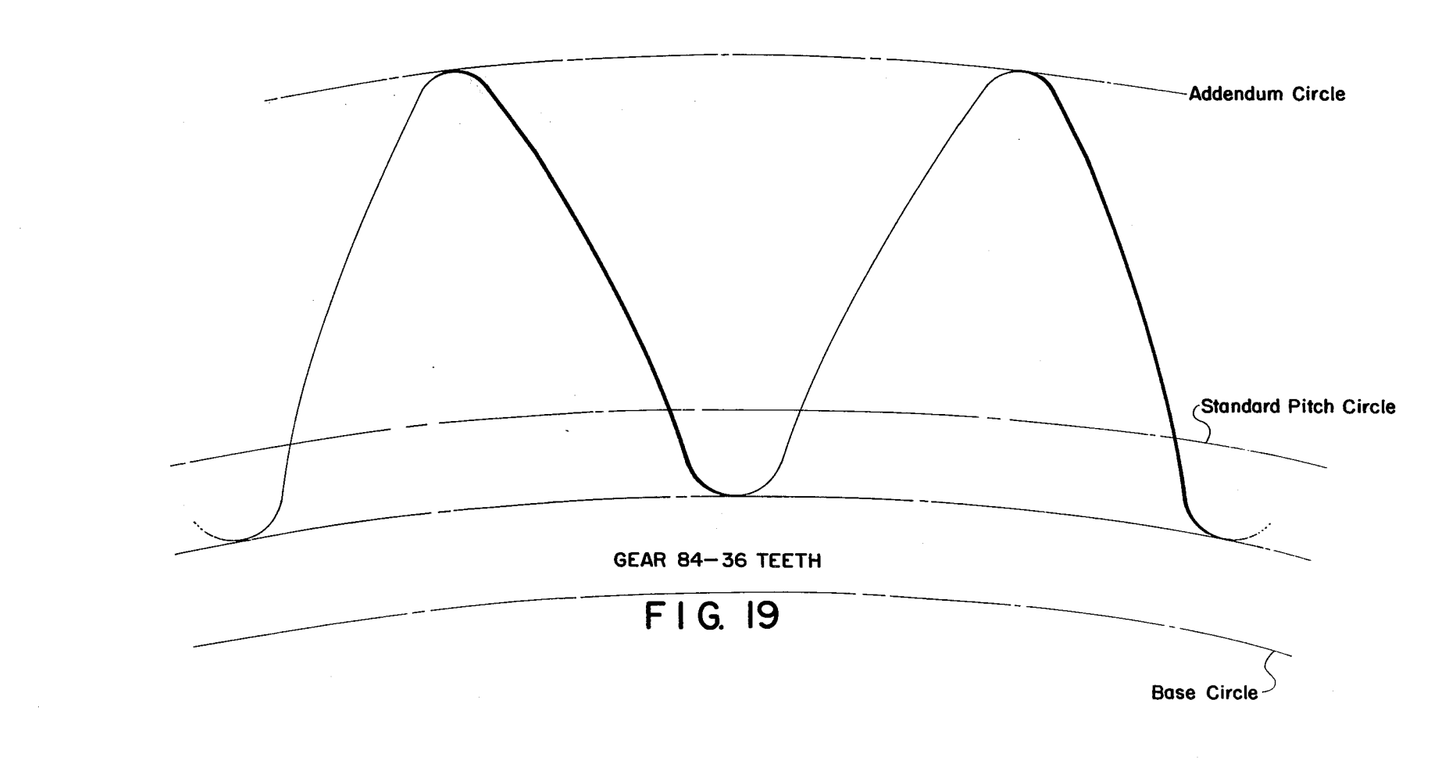
FIG. 19 is a drawing of the tooth profile embodying the present invention of a 36-tooth long addendum gear.

The unique tooth profiles for pinion 136 and gear 84 are shown separately in FIGS. 18 and 19. Portions of these two gears are shown in mesh in FIG. 20. The tooth profiles are based on involute curves and have pointy tips to minimize nonmeshing tip abutment. The spacing between adjacent tips is substantially equal despite the fact that the two gears provide a speed ratio of other than 1:1. It will be noted that the tooth profile on the 12-tooth pinion gear 136 is short and rather thin when compared to the thicker and longer tooth profile of gear 84.

Figure 20:
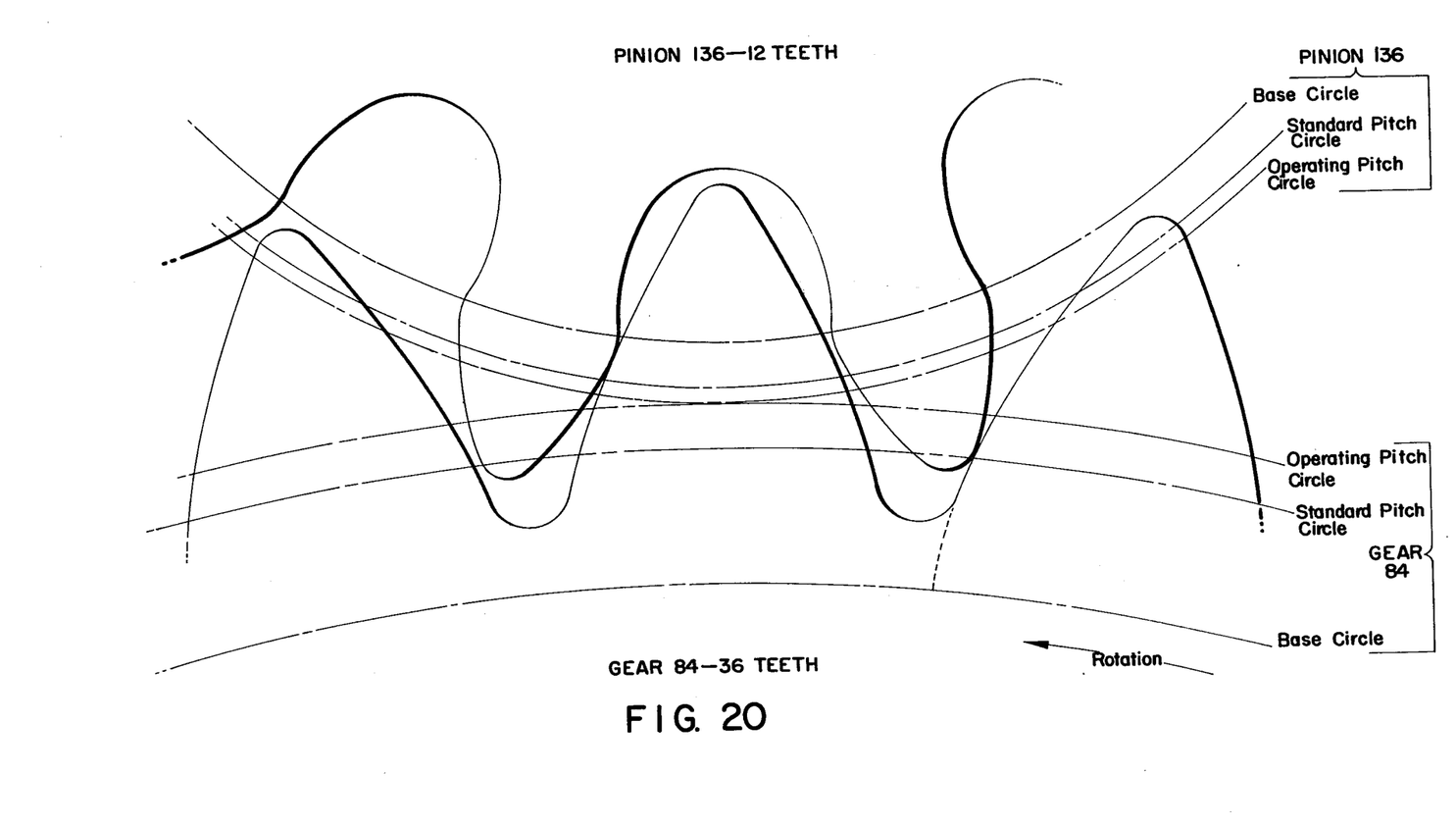
FIG. 20 shows the unique gears of FIGS. 18 and 19 in operative mesh.

Unlike the diagrammatic illustration of gears 136 and 84 in some of the earlier drawings, the tooth profiles of pinion 136 and gear 84 in FIGS. 18, 19, and 20 are accurate representations.

The following table will provide numbers for selected parameters:

|  | Pinion 136 | Gear 84 |
|---|---|---|
| Number of Teeth | 12 | 36 |
| Diametral Pitch | 48 | 48 |
| Pressure Angle | 20° | 20° |
| Pitch Circle Diameter | .250 in. | .750 in. |
| Base Circle Diameter | .235 in. | .705 in. |
| Addendum | .0195 in. | .0445 in. |
| Dedendum | .0398 in. | .0115 in. |
| Tip-to-Tip Spacing | .0722 in. | .0722 in. |

It will be noted that the addendum of pinion 136 exceeds the addendum of gear 84 by a ratio in excess of 2:1.

Despite the fact that the unique tooth profiles shown in FIGS. 18, 19, and 20 depart from standard practice, it should be noted that the desirable 20° pressure angle has been maintained and that the contacting surfaces of the gear teeth are based on involute curves. In other words, equal tip spacing and pointy tips have not been designed into gears 136 and 84 at the expense of gear efficiency. If there is any penalty to pay for insurance that these gears will mesh when the loading door section 50 is moved from the open inoperative position to the closed operative position, it is in terms of material selection for pinion gear 136. That is, because of the undercut and their tooth structure, one would fabricate pinion 136 from a stronger material than one would normally select for this application and load if standard profile or long addendum teeth were to be used on pinion 136.

From the above table it will be seen that the ratio of the addendum of gear 84 to the addendum of pinion 136 is at least 2:1.

FIG. 20 shows a standard pitch circle and an operating pitch circle for each gear. The measurements in the preceding table are taken relative to the standard pitch circle. The operating pitch circle indicates that in this particular camera these two gears are configured to be mounted on centers that are just slightly further apart than standard center spacing to adapt these gears to the particular dimension and spacing of the camera components. However, the inventive concept of providing a short addendum pinion and long addendum mating gear with equal tip spacing may be applied to gears spaced on standard lines of centers.

From the designation of the number of teeth in each gear segment of the gear train shown in FIG. 5, one skilled in the art will appreciate that the speed reduction from motor 68, which preferably has a nominal operating speed of 11,500 rpm, to the top roller is very close to 1:25 and, of course, the speed ratio of the follower gear 84 to the driver pinion 136 is 1:3.

It will be noted from FIGS. 4 and 5 of the drawings that gear 84 moves along a pivotal path between the inoperative and operative positions. This coupled with the fact that roller 81 and therefore gear 84 coupled thereto are in a free wheeling condition will facilitate mesh of gear 84 even if the pointy teeth of these gears illustrated in FIGS. 18, 19, and 20 should initially come into tip-to-tip contact. The pivotal movement enhances the ability of the free wheeling gear to roll into the proper mesh engaging attitude relative to pinion one 136 once initial contact is made by the equally spaced tips (as measured between the radial end centerlines of adjacent teeth).

Since certain changes may be made in the above apparatus without departing from the scope of the invention herein involved, it is intended that all matter contained in the above-described description and shown in the accompanying drawings shall be interpreted as illustrative and not in a limiting sense.

What is claimed is:

1. Photographic apparatus having at least one motor driven component, said apparatus comprising:
    a housing including first and second housing sections interconnected for movement between an operative position wherein said first and second sections are in operative alignment and an inoperative position wherein said first and second sections are spaced apart and are not operatively aligned;
    a motor in said first housing section for driving at least one component of said apparatus;
    at least one component of said apparatus on said second housing section adapted to be driven by said motor when said first and second housing sections are located in said operative position and said motor is operative; and
    a gear train, coupling said motor to said at least one component when said first and second housing sections are in said operative position, for transmitting power from said motor to said at least one component, when said motor is operative;
    said gear train including at least one pinion mounted on one of said first and second housing sections and at least one gear mounted on the other of said first and second sections, said pinion and gear being configured to be engaged in operative mesh when said first and second housing sections are located in said operative position and to be disengaged from each other when said first and second housing sections are located in said inoperative position;
    said pinion and gear having respective tooth profiles whereby the addendums said pinion and gear are unequal, said pinion teeth having a shorter addendum than said teeth on said gear, said respective tooth profile being configured for conjugate action based on involute curves, and said respective tooth profiles also being configured such that tip spacing, as measured between the midpoints of radial end tips of adjacent teeth on said pinion and said gear, is substantially equal for facilitating bringing said pinion and gear into operative mesh when said first and second housing sections are moved from said inoperative position to said operative position.

2. Photographic apparatus as defined in claim 1 wherein said pinion is mounted on said first housing section and said gear is mounted on said second housing section.

3. Photographic apparatus as defined in claim 2 wherein said pinion functions as a driver and said gear functions as a follower and the speed ratio of the follower to driver is 1:3.

4. Photographic apparatus as defined in claim 1 wherein the ratio of the length of the addendum of said gear to the length of the addendum of said pinion is at least 2:1.

5. Photographic apparatus as defined in claim 1 wherein said pinion has 12 teeth and said gear has 36 teeth.

6. Photographic apparatus as defined in claim 5 wherein the dimetral pitch of said pinion and gear is 48.

7. Photographic apparatus as defined in claim 1 wherein the pressure angle of said pinion and gear as 20°.

8. Photographic apparatus as defined in claim 1 wherein said apparatus is configured to process a self-developing film unit and said at least one component includes one of a pair of pressure-applying rollers between which a self-developing film unit is advanced subsequent to exposure.

9. Photographic apparatus as defined in claim 8 wherein said pinion is mounted on said first housing section and said gear is coupled to said one roller on said second section, said pinion serving as a driver and said gear serving as a follower.

10. Photographic apparatus as defined in claim 9 wherein the speed ratio of said follower to said driver is 1:3.

11. Photographic apparatus as defined in claim 9 wherein the ratio of the addendum of the gear teeth to the addendum of the pinion teeth is at least 2:1.

12. Photographic apparatus as defined in claim 11 wherein said pinion has 12 teeth and said gear has 36 teeth.

13. Photographic apparatus as defined in claim 10 wherein said tooth profiles of said pinion and gear teeth are configured such that said teeth on pinion and gear are substantially pointed at said radial end tips to minimize tip-to-tip abutment when said pinion and gear make initial contact when first and second housing sections are moved from said inoperative to said operative position.

14. A self-developing camera for exposing and processing self-developing film units, said self-developing camera comprising:
- a first housing section having a chamber therein in which a self-developing film unit is adapted to be located for exposure, said first housing section having an opening therein providing access to said chamber;
- a second housing section coupled to said first housing section for movement between an operative position wherein said second section is in blocking relation to said opening in said first housing and an inoperative position wherein said second section is located in unblocking relation to said opening for providing access to said opening;
- a pair of pressure-applying rollers, mounted on said second housing section for movement therewith between said operative and inoperative positions, for applying a compressive pressure to such a film unit as it is advanced between said pair of rollers subsequent to exposure when said second housing section is located in said operative position;
- a motor mounted in said first housing section and
- a gear train coupling said motor to at least one of said pair of pressure rollers when said second housing section is located in said operative position for transmitting power from said motor to said one roller to cause said one roller to rotate and advance such a film unit relative to said pair of rollers;
- said gear train including a driver pinion mounted on said first housing section and a follower mating gear mounted on said second housing section for movement therewith such that said pinion and gear engage in operative mesh when said second housing section is located in said operative position and are disengaged from one another when said second housing section is moved from said operative position to said inoperative position;
- said pinion and said gear having respective numbers of teeth and gear tooth profiles such that the speed ratio of said pinion and gear is other than 1:1 and the tip spacing of the teeth on said gear and pinion, as measured between the midpoints of the radial end tips of adjacent teeth, is substantially equal to facilitate bringing said gear into operative mesh with said pinion when said second housing section is moved from said inoperative position to said operative position.

15. A self-developing camera as defined in claim 14 wherein said pinion and gear have unequal addendums and the addendum of said pinion is shorter than said addendum of said gear.

16. A self-developing camera as defined in claim 15 wherein the ratio of said gear addendum to said pinion addendum is at least 2:1.

17. A self-developing camera as defined in claim 15 wherein said pinion has 12 teeth, said gear has 36 teeth and both said pinion and said gear have a pressure angle of 20°.

18. A self-developing camera as defined in claim 15 wherein the gear teeth of said pinion and gear are substantially pointed.

19. A self-developing camera as defined in claim 15 wherein the active surfaces of said respective gear tooth profiles are based on involute curves.

20. A separable gear train, usable in a photographic apparatus for transmitting power from a motor to a motor-driven component of the appartus, said gear train comprising:
- a first gear adapted to be coupled to and driven by the motor;
- a second gear adapted to be coupled to the motor driven component and being configured for movement, relative to said first gear, between an operative position wherein said second gear is engaged in operative mesh with said first gear whereby said second gear serves as follower of and is driven by said first gear, and inoperative position wherein said second gear is disengaged from said first gear;
- said first and second gears having respective numbers of teeth and tooth profiles such that the speed ratio of said first and second gears is other than 1:1 and the tip spacing of said first and second gears, as measured between the midpoints of the radial ends of adjacent teeth, is substantially equal to facilitate bringing said first and second gears into operative mesh when said second gear is moved from said inoperative position to said operative position, said second gear being a pinion and said first gear being a mating gear, said addendum of said pinion being shorter than the addendum of said mating gear whereby the ratio of the length of the addendum on said mating gear to the length of the addendum of said pinion is at least 2:1, said profiles of the contacting surfaces of said pinion and said gear being based on involute curves and said pinion and gear having teeth that are substantially pointed.

* * * * *